L. R. NELSON.
HOSE CONNECTOR.
APPLICATION FILED JUNE 7, 1911.
1,051,621.
Patented Jan. 28, 1913.
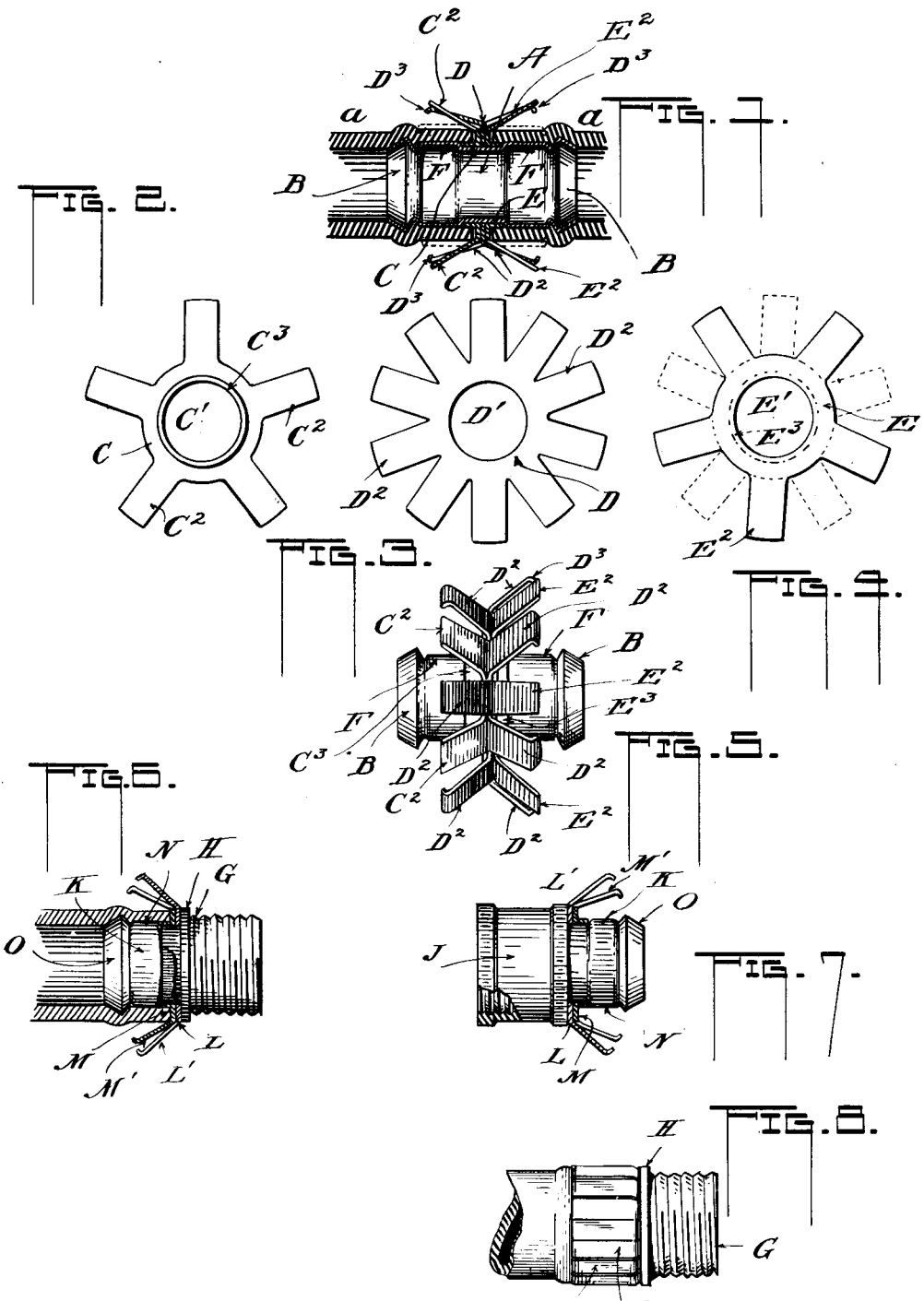

UNITED STATES PATENT OFFICE.

LEWEN R. NELSON, OF PEORIA, ILLINOIS.

HOSE-CONNECTOR.

1,051,621.  Specification of Letters Patent.  Patented Jan. 28, 1913.

Application filed June 7, 1911. Serial No. 631,863.

*To all whom it may concern:*

Be it known that I, LEWEN R. NELSON, citizen of the United States, residing at Peoria, in the county of Peoria and State of Illinois, have invented certain new and useful Improvements in Hose-Connectors; and I do hereby declare that the following is a full, clear, and exact description of the invention, which will enable others skilled in the art to which it appertains to make and use the same.

This invention relates to improvements in that class of devices known as hose connectors or hose menders used for connecting or joining the ends of hose sections.

It also relates to a connector or mender for connecting the ends of a broken hose in an absolutely permanent manner. Also to means for attaching a hose to a hose-coupling such as is used for connecting hose-sections, or for coupling a hose to a faucet, hydrant, pipe or other part or fixture.

An object of the invention is to provide a connector for hose sections by which said sections can be permanently or inseparably connected.

Another object is to provide a device for a hose fitting which will secure the hose to said fitting in an absolutely permanent manner or so as to render the hose and the fitting inseparable.

All the above are accomplished by the use of a combination of parts new in the art.

The invention, besides the foregoing, relates to certain details of construction for bringing about certain desired definite results all of which will appear in the following specification aided by the accompanying drawing in which:

Figure 1 is a longitudinal section of a hose connector. Fig. 2 is a face view of a hose-engaging member provided with a series of radiating fingers. Fig. 3 is a second hose-engaging member also provided with a series of fingers. Fig. 4 is a third hose-engaging member similar to that in Fig. 2. Fig. 5 shows the connector completely assembled. Fig. 6 is a side elevation of a hose-fitting showing a portion of a hose in connection therewith. Fig. 7 shows another form of fitting. Fig. 8 shows the fitting illustrated in Fig. 6 with its parts in the hose holding position.

Before proceeding with the description of the invention in detail it is to be stated that the purpose of the structure is to provide a form of connector or mender somewhat different from and having certain advantages over that shown in my former Patent No. 946,703, issued January 18, 1910, by providing three hose-engaging members, instead of two, for clamping the hose. In this patent the two hose-engaging members are mounted upon a tubular hose-receiving part and each engages a separate hose-end, while in the device to be described, in place of the two members mentioned, two members of a different kind are used together with a third hose-holding member, all three of the members being forced into engagement with the said hose-ends. This has been stated in order that the differences in structure will be readily apparent, while the advantages of the new form will appear as the description proceeds.

A indicates a tube preferably of a ductile metal forming a connecting member for the hose-ends and upon which the said ends to be joined are placed, these being indicated at $a\ a$. This tubular member A is provided with an enlargement or head B at each end by expanding the metal in any suitable manner.

C, E and D represent three hose-engaging members which may be designated as first, second and third respectively. They are all made of sheet metal, the first having a central hole $C'$ and provided with a series of spaced radiating fingers $C^2$ and, in addition, it is preferably provided with an annular flange $C^3$ "formed up" from the metal around the hole $C'$ although this flange may not be used. The "second" member E is a duplicate of the "first" in having a central opening $E'$ and the radiating spaced fingers $E^2$. It may also have a flange $E^3$, if desired, to correspond with $C^3$ described. The "third" member D is provided with a corresponding central opening $D'$ and a series of radiating fingers $D^2$, these said fingers being greater in number than the number on either of the members C and E described and this said member preferably does not have a flange surrounding its central opening, being merely a flat plate. The three members are slipped upon the tube A before the heads B B are formed, their bores being but slightly larger than the diameter of the tube or such that they can be readily slipped upon it. The relation of the rings one to another is clearly shown in Fig. 1 wherein, for instance, the members C and E are placed with their flat sides facing one another or with the flanges $C^3$ and $E^3$ facing in opposite directions. The member D is secured between the inner facing surfaces of the members C, E, and all of the parts may be secured together upon the tube A by any good means. Preferably I provide for this purpose an enlargement F at each side of the position of the parts by expanding the tube so as to make it of larger diameter than that portion upon which the members are retained and these enlargements serve to prevent movement of the members relatively and also prevent their rotation upon the tube or shifting movement along it in a longitudinal direction. While it is not new to employ enlargements to hold hose engaging members in position there is a particular advantage in the form of such enlargements in the present mender, but this will appear later.

It is observed that the members C and E in the present instance are shown with five fingers each, though a greater or less number may be used, and also that when secured in position upon the tube A the fingers of one member lie opposite the spaces between the fingers of the other member, as indicated by broken lines in Fig. 4, and the fingers of each member are bent outward in opposite directions as clearly shown in Figs. 1 and 5. The central or third member D as shown in Fig. 3, has twice as many fingers as either of the members C, E, but a less number may be used and will be shown presently, and when in position one of its fingers, in the present instance, lies opposite each of the fingers of both those members. Since the fingers $C^2$ and $E^2$ are spaced apart the open spaces between them are filled by the fingers of the middle member. As all of the fingers of one of the members are bent in a direction opposite those of the other, the fingers of the third or central member D can be bent alternately in opposite directions; one of them lying within each of the said spaces between the said fingers $C^2$ and $E^2$, as indicated in Fig. 5 by the several reference characters, and the ends of the fingers of said third member are provided with spurs $D^3$ to obtain a firm hold upon the hose. Preferably the fingers of the three members are all of such a width that when all are bent down upon and in engagement with the hose as indicated, for instance, in one of the forms of fittings in Fig. 8, they will constitute practically a continuous band around the hose since their edges will practically abut. As distinguished from my former patent referred to wherein two members corresponding to C E herein are employed, the fingers of which adjoin at their bases, those in the present instance are spaced apart and permit the fingers of the third member D to lie in the resulting spaces for the special purpose of engaging both the hose-ends. This structure and arrangement prevents said hose-end from rotating upon the member A, should the members C E be loose, and also since both the hose-ends are held by the one member D they cannot readily be drawn apart as may result when a single member C E engages them, since in dragging the hose over the ground or otherwise subjecting it to great strain one or the other of the members C E, may leave its position should the enlargement F be improperly formed. The ends of all of the fingers of the three members when bent down terminate just behind the heads B so that the hose is forced down and held behind said head and aid in preventing the hose being separated from the connector.

The enlargements F as before stated are greater in diameter than the interior diameter of the hose so that when the latter is forced upon them it is distended and made of larger diameter thereby causing it to be stretched upon said enlargement to further aid in preventing leakage around it.

I have stated that a greater or less number of fingers $C^2$ and $E^2$ can be employed this being elective. It has been said, also, that a less number of fingers $D^2$ can be used than shown. A reduction in number is possible and such of said fingers $D^2$ as may be employed may lie opposite the spaces between the fingers of the members C E as shown and as before described, or they may overlie said fingers or lie opposite both the fingers and the spaces, but this all lies within the meaning of my invention.

Returning now to the consideration of the peculiar form of the enlargement F, used in the several forms herein, it is to be said that each said enlargement, together with the flanges $C^3$ and $E^3$, constitutes practically a continuous straight surface from a point behind the heads B to the rings C E and of a diameter larger than the interior diameter of the hose. When the hose-end is forced over the head B it is distended and kept so for the distance it overlies the said enlargement and the flange of the adjacent ring. Now, when the fingers of the ring are bent down flat upon the hose they clamp it upon the described parts besides forcing it behind the head B. Thus the chance for leakage is very remote and much more so than where a mere annular rib or flange is employed, because the adjoining surfaces of the fingers and the enlargement clamp the hose between them for a considerable distance. This distinguishes the present device from that of my issued patent referred to in this respect. This feature, together with the third or middle ring D constitute important parts of my invention.

In Figs. 6, 7 and 8 I have illustrated the hose-engaging members in connection with fittings of the male and female threaded type for attaching hose sections to one another or for attaching a section to a hydrant, faucet, sprinkling device or the like. In the first of the figures G indicates a threaded male fitting having a flange H against which the end of a female member J, Fig. 7, may abut. Upon the stem K of the fitting G behind and bearing against the said flange H is a member L corresponding to the member D, before described. Adjacent this member L is a member M which is identical with one of the members C E of the other form described and as in said other form the stem K is enlarged at N for securing the members L M in place and the free or outer extremity of the stem has a head O over which the hose is forced. When the latter is in position the two series of fingers L′ M′ of the members L and M respectively, which series may both be equal in number, are forced down upon it, those of one or the other of them having spurs bent down if desired to better engage the hose, but, if desired, the fingers of both the members may be provided with these said spurs. The construction of the female fitting in Fig. 7 is identical with that just described and in Fig. 8 the fingers of the members are shown in their hose engaging positions it being understood that the fingers M′ lie in the spaces between the fingers L′ as in the former instance.

I may not employ the flanges of the members C, E and M but merely use the flat metal parts and in this event the enlargements F would, of course, extend closer to the middle of the member A to properly hold said members. It is preferable, however, to employ said flanges since by that means the device is stronger and there would be no possibility of the members rocking or tilting upon the said member A.

An advantage in the particular form of the members C E and the others having spaced fingers, is that the dies for making the same can be more easily made since in widely separating or spacing the fingers the portion of the dies need not be made with such sharp angles or points and they are therefore not as easily damaged. The fingers of one member lie in the spaces between the fingers of the other, and their edges abut thereby producing the same result as that obtained by fingers which directly adjoin at their bases. For instance, ring D may coöperate with ring E, when the alternate fingers $D^2$ of the former will lie opposite the spaces between the fingers of the latter and are adapted to be bent down between them, while the other set of alternate fingers of ring D extend in the opposite direction for the purpose of clamping a hose end, or this last mentioned hose end may be clamped or secured to the structure in some other suitable manner.

It is to be understood from the foregoing description of my invention and from the figures of the drawing that the ring D, which is the middle one, may coöperate with only one of the rings C E which would form an operable combination, together with the tubular member.

Slight changes, of course, may be made in the device such as will fairly fall within the meaning of the invention.

Having described my invention, I claim:

1. A hose connector comprising a tubular member, a ring secured thereon and provided with spaced extensions and a second ring also secured on the member and provided with spaced extensions adapted to lie between the extensions of the first and extending in the same direction, all the said extensions adapted to extend in a single given direction, said tubular member extending beyond the two rings in the opposite direction and adapted to receive a conduit.

2. A hose connector comprising a tubular member, a ring secured thereon and provided with spaced extensions, and a second ring on said member also provided with spaced extensions lying opposite the spaces of the first, and all extending in the same direction.

3. A hose connector comprising a tubular member, a ring carried by it and provided with spaced extensions, a second ring associated with the member and the first said ring and also provided with spaced extensions, the extensions of both rings overhanging the member and extending in the same direction and arranged to lie parallel to one another and substantially abut one another, the tubular member projecting beyond the rings in a direction opposite to the direction in which the extensions of said rings extend.

4. A hose connector comprising a tubular member, a part carried by it and provided with a series of fingers spaced apart extending in a single direction and adapted to engage a hose-end, and a second part associated with the first and also having a series of fingers lying opposite the spaces between the fingers of the said first part and extending in the same direction, both series of fingers adapted to overlie and engage the hose-end, the series of the second named part overlying the first part between its fingers.

5. A hose connector comprising a pair of associated rings provided each with a series of fingers, the series of fingers of each ring extending in the same direction and adapted to engage a hose-end, and a member for carrying said rings.

6. A hose connector comprising a pair of associated rings provided each with a series of fingers extending in a single direction and adapted to engage the end of the hose, and having their edges substantially abutting to form a substantially continuous band around said hose, and including an extending tubular part projecting beyond the rings in a direction opposite that in which the fingers extend.

7. A hose connector comprising a tubular member to receive the hose-ends, a ring mounted thereon and provided with spaced radiating fingers or extensions, a second ring also provided with spaced extensions, and a third ring associated with the other two and having a series of adjoining fingers each of which lies opposite one of the spaces of the said other rings.

8. A hose connector comprising a member for receiving the hose-ends, a pair of rings carried by said member, each provided with spaced fingers, the fingers of one ring lying opposite the spaces between the fingers of the other ring, and a third ring interposed between the first two rings and having a series of fingers adjoining at their bases and equal in number to the fingers of both rings and lying opposite the spaces between the fingers of both said rings.

9. A member provided with a bore and adapted at each end to receive a hose-end, a ring carried at substantially the middle of said member and having a series of fingers adapted to engage one of the hose-ends, and a second ring also having a series of fingers, part of them overlying and engaging the last-named hose-end, and part of them overhanging the opposite end of the first named member.

10. A member provided with a bore and adapted to receive the end of a hose at each end, a ring carried thereby and having a series of spaced fingers adapted to engage one of the hose-ends, and a ring also having a series of fingers, part of them lying between the fingers of a second described member and engaging the hose, the other of its fingers engaging the other hose-end.

11. A hose connector comprising a tubular member provided at its ends with an enlargement or head and having an annular depression inward from and adjoining each head, and also having inward from each depression a substantially straight portion of greater diameter than the diameter of these depressions, said member between the straight portions being smaller in diameter than said portions, and hose engaging parts seated in the depression between the portions and having extensions adapted to overlie them.

12. A hose connector comprising a tubular member having a central annular depression, hose engaging parts seated in said depression, at least one of said parts comprising a ring having an outwardly extending flange, a bent over flange seated upon the tubular member and extending toward one end thereof in alinement with the tubular portion adjacent said depression, and hose clamping parts extending from said outwardly extending flange over the tubular member.

In testimony whereof I affix my signature, in presence of two witnesses.

LEWEN R. NELSON.

Witnesses:
P. M. NELSON,
L. M. THURLOW.